United States Patent
Birkel et al.

(10) Patent No.: US 7,942,074 B2
(45) Date of Patent: May 17, 2011

(54) GEARBOX WITH SYNCHRONIZING CLUTCH

(75) Inventors: Jeffrey F. Birkel, Pekin, IL (US); Alan J. Griffiths, Wolverhampton (GB)

(73) Assignee: Turner Powertrain Sytems Limited, Wolverhampton (GB)

( * ) Notice: Subject to any disclaimer, the term of this patent is extended or adjusted under 35 U.S.C. 154(b) by 696 days.

(21) Appl. No.: 11/976,269

(22) Filed: Oct. 23, 2007

(65) Prior Publication Data
US 2008/0098836 A1 May 1, 2008

(30) Foreign Application Priority Data

Oct. 26, 2006 (EP) .................................. 06255503

(51) Int. Cl.
*F16H 3/08* (2006.01)
*F16H 59/00* (2006.01)
*F16H 61/00* (2006.01)
*F16H 63/00* (2006.01)

(52) U.S. Cl. ........................... 74/325; 74/331; 74/336 R
(58) Field of Classification Search .................... 74/325, 74/331, 335, 336 R
See application file for complete search history.

(56) References Cited

U.S. PATENT DOCUMENTS

| | | | |
|---|---|---|---|
| 2,241,861 A | 5/1941 | Lang | |
| 2,991,661 A * | 7/1961 | Rambausek | 74/330 |
| 3,578,760 A | 5/1971 | Shinmura | |
| 4,693,129 A | 9/1987 | Pierce | |
| 4,727,472 A * | 2/1988 | Deutsch et al. | 700/78 |
| 4,727,764 A * | 3/1988 | Klaue | 74/331 |
| 4,785,682 A * | 11/1988 | Nishimura et al. | 74/359 |
| 5,117,702 A * | 6/1992 | Rodeghiero et al. | 74/359 |
| 5,651,288 A * | 7/1997 | Meeusen | 74/333 |
| 6,217,473 B1 * | 4/2001 | Ueda et al. | 475/216 |
| 6,820,512 B2 * | 11/2004 | Hedman | 74/330 |
| 7,174,996 B2 * | 2/2007 | Hori et al. | 184/6.12 |

FOREIGN PATENT DOCUMENTS

| | | |
|---|---|---|
| DE | 199 31 770 | 1/2001 |
| EP | 0 173 117 | 3/1986 |
| EP | 0 902 219 | 3/1999 |
| GB | 2 335 010 | 9/1999 |
| WO | WO 2008/029077 A1 | 3/2008 |

OTHER PUBLICATIONS

European Search Report dated Feb. 6, 2007 in Application No. 06255503.2-2421 (6 pages).

* cited by examiner

*Primary Examiner* — Tisha D Lewis
(74) *Attorney, Agent, or Firm* — Finnegan, Henderson, Farabow, Garrett & Dunner LLP

(57) ABSTRACT

A gearbox having at least two gears is disclosed. The gearbox includes a shift selector, a first gearshaft, a second gearshaft selectively engagable with the first gearshaft via the at least two gears, and a first clutch mechanism located on the second gearshaft. The first clutch mechanism is configured to selectively engage the second gearshaft with the first gearshaft. The first clutch mechanism includes a clutch plate attached to first gear on the second gearshaft, and a pressure plate attached to the second gearshaft. The clutch plate and pressure plate are configured to selectively engage one another so that the second gearshaft engages the first gearshaft.

21 Claims, 3 Drawing Sheets

GEARBOX WITH SYNCHRONIZING CLUTCH

TECHNICAL FIELD

The present disclosure is directed to a gearbox, and more particularly, to a gearbox with a synchronizing clutch.

BACKGROUND

Conventional gearboxes for vehicles employ synchronizer rings to ensure smooth shifts between gears in the gearbox. The synchronizer rings ensure that the shift collar and the desired gear make frictional contact before the teeth of the collar engage the gear. In this way, the rotational speeds of the gearshafts in the gearbox are progressively synchronized, thereby allowing a gearshift to take place without any mis-engagement of the collar teeth and the desired gear.

Synchronizer rings add significantly to the cost of manufacture of a gearbox. As a result, there have been a number of proposals put forward in order to remove the need for synchronizer rings in gearboxes. In removing the synchronizer rings, there is a need to ensure synchronization of the rotational speeds of the gearshafts in another way before a gearshift can be allowed to occur. Otherwise, the mis-engagement, referred to above, can still occur, leading to difficulties in achieving a shift, and also potentially damaging the gearbox components. Therefore, when removing the synchronizer rings from a gearbox, it is important to ensure that a shift cannot take place until the synchronization of the gearshaft speeds has occurred.

Synchronizerless shifting mechanisms have been previously proposed. UK Patent Application GB 2 335 010 (GB '010) discloses a synchronizing unit which synchronizes the rotational speeds of a layshaft and output shaft in a gearbox. The unit comprises first and second auxiliary gears which are fitted to respective first ends of the layshaft and output shaft. The unit further comprises a solenoid-controlled clutch on the output shaft for accelerating the layshaft, and a solenoid-controlled brake for slowing down the layshaft. The brake is applied to one of the first or second auxiliary gears to slow the layshaft. A controller monitors shaft speeds and gear selector positions in order to control the unit.

Unfortunately, the unit disclosed in GB '010 is fitted as a "bolt-on" onto the end of the gearbox, so that the auxiliary gears can be fitted onto the ends of the respective shafts. As a result, adding the unit to a gearbox may increase the overall size of the gearbox. In the vast majority of vehicles, it is an objective that gearboxes are of certain dimensions so that they fit within the spaces designed for them. The unit of GB '010 can therefore compromise design requirements in existing vehicles, and in many instances may prove difficult to retro-fit to conventional gearboxes due to the increased size.

Additionally, the unit of GB '010 may result in added weight and in complexity of introducing a brake to slow down the layshaft. In using a brake, a number of further mechanical components are added to the gearbox. Not only do these components increase the overall weight of the gearbox, but they may also be subjected to very large friction forces. By increasing the complexity of the gearbox and subjecting the added components to such forces, the risk of malfunction or breakdown also may be increased.

The present disclosure is directed to one or more improvements in the existing technology.

SUMMARY

In one aspect, the present disclosure is directed to a gearbox having at least two gears. The gearbox includes a shift selector, a first gearshaft, a second gearshaft selectively engagable with the first gearshaft via the at least two gears, and a first clutch mechanism located on the second gearshaft. The first clutch mechanism is configured to selectively engage the second gearshaft with the first gearshaft. The first clutch mechanism includes a clutch plate attached to first gear on the second gearshaft, and a pressure plate attached to the second gearshaft. The clutch plate and pressure plate are configured to selectively engage one another so that the second gearshaft engages the first gearshaft.

In another aspect, the present disclosure is directed to a machine including a gearbox. The gearbox includes a plurality of gears, a shift selector, a first gearshaft, a second gearshaft selectively engagable with the first gearshaft via at least two of the plurality of gears, and a first clutch mechanism located on the second gearshaft. The first clutch mechanism is configured to selectively engage the second gearshaft with the first gearshaft. The first clutch mechanism includes a clutch plate attached to first gear on the second gearshaft, and a pressure plate attached to the second gearshaft. The clutch plate and pressure plate are configured to selectively engage one another so that the second gearshaft engages the first gearshaft.

DETAILED DESCRIPTION

Figure 1:
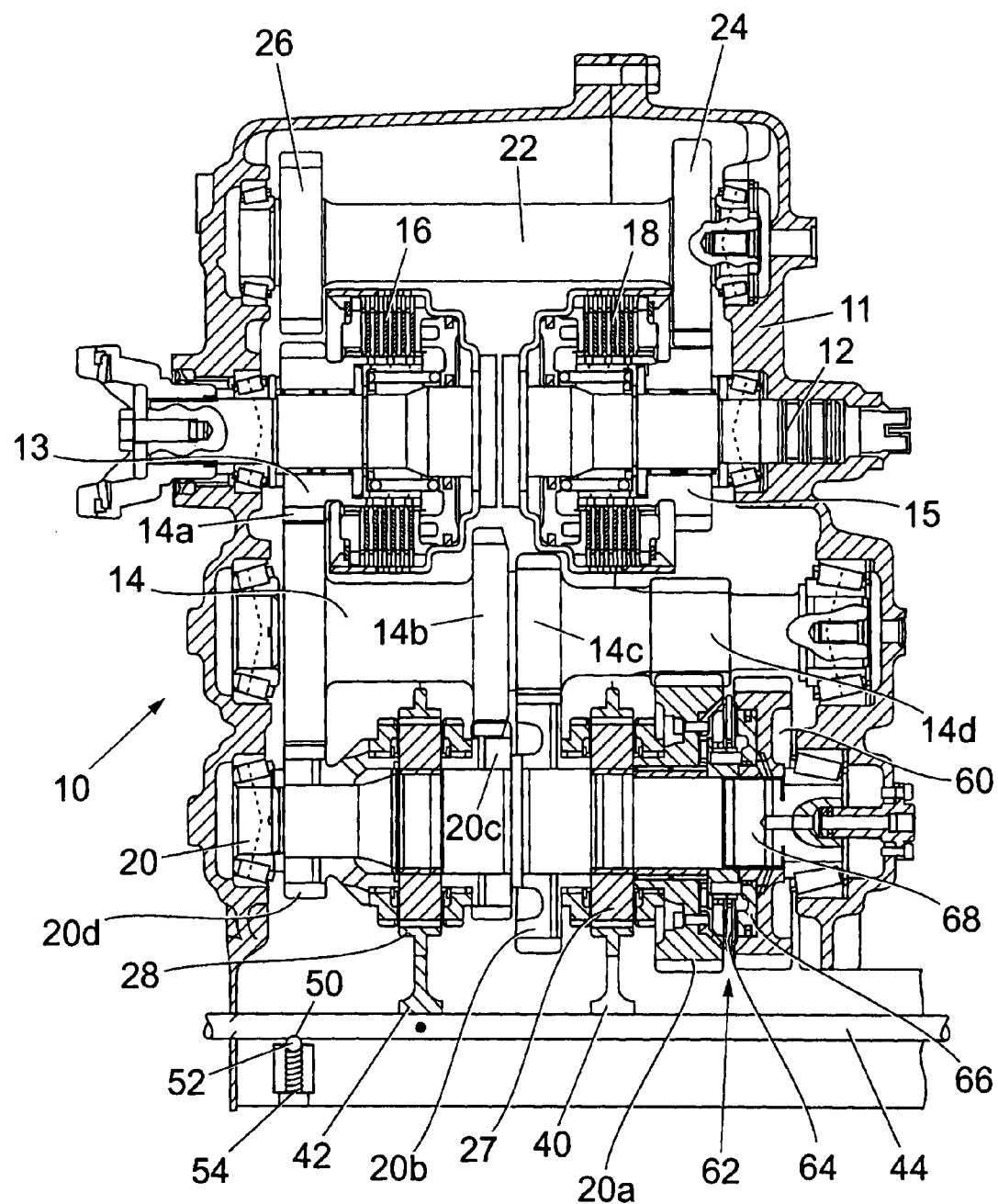
FIG. 1 shows a schematic cut-away view of an exemplary gearbox.

The gearbox shown in FIG. 1, and generally designated 10, comprises a housing 11 and a plurality of co-operating shafts rotatably supported therein. A power input shaft 12 is connected to an external motive power source, typically the crankshaft of an internal combustion engine (not shown). Located on the power input shaft 12 are forward and reverse clutch mechanisms, also known as clutch packs, 16, 18. The forward clutch mechanism 16 is configured to selectively engage the power input shaft 12 and a first gearshaft 14, and cause rotation of the first gearshaft 14 in a first direction. This is effected by way of a first clutch gear 13 whose teeth are permanently engaged with corresponding teeth on a first fixed gear 14a on the first gearshaft 14. When the forward clutch mechanism 16 is disengaged, the power input shaft 12 does not rotate the first gearshaft 14, as there is no connection between the power input shaft 12 and the first clutch gear 13. When the forward clutch mechanism 16 is engaged, the power input shaft 12 is connected to the first clutch gear 13 and hence the first gearshaft 14.

The reverse clutch mechanism 18 is configured to selectively engage the power input shaft 12 and the first gearshaft 14 and cause rotation of the first gearshaft 14 in a second direction opposite to the first direction. This is effected by way of a second clutch gear 15 whose teeth are permanently engaged with the teeth of a first idler gear 24 fixed at a first end of an idler shaft 22. A second idler gear 26 is fixed to the opposite end of the idler shaft 22 and has teeth which are in permanent engagement with the teeth of the first fixed gear 14a on the first gearshaft 14.

For illustrative purposes, the idler shaft 22 has been shown in FIG. 1 lying alongside the power input shaft 12. In reality, as will be appreciated by those skilled in the art, the idler shaft 12 is located in proximity to both the power input shaft 12 and first gearshaft 14 so that the idler gears 24, 26 may engage the respective gears of those shafts, as described above.

When the reverse clutch mechanism 18 is disengaged, the power input shaft 12 does not rotate the idler shaft 22 and first gearshaft 14, as there is no connection between the power input shaft 12 and the second clutch gear 15. When the reverse clutch mechanism 18 is engaged, the power input shaft 12 is connected to the second clutch gear 15, the idler shaft 22, and hence the first gearshaft 14. By introducing the idler shaft 22, it will be clear that the direction of rotation of the first gearshaft 14 will be opposite to that when the forward clutch mechanism 16 is engaged.

The illustrated embodiment of the gearbox is suitable for use in a suitable machine, for example, a vehicle, which has a number of forward and reverse gears. Whichever clutch is deployed will depend on the direction of travel of the machine. It will be appreciated that in normal operating conditions only one clutch mechanism 16, 18 can be engaged at a time.

The first gearshaft 14 has a plurality of fixed gears 14a-14d fixed thereto. Each of the fixed gears 14a-14d is permanently engaged with a corresponding gear 20a-20d on a second gearshaft 20. In the conventional manner, each gear 20a-20d is supported on the second gearshaft 20 by a bearing (not shown). Thus, the gears 20a-20d can rotate independently of the second gearshaft 20. Also located on the second gearshaft 20 are a pair of shift collars 27, 28 which rotate with the second gearshaft 20 but can move axially back and forth on the gearshaft 20 to engage respective pairs of gears. In the illustrated embodiment, the first collar 27 engages first and second gears 20a, 20b, while the second collar 28 engages third and fourth gears 20c, 20d.

Rotatably fixed to the second gearshaft 20 is an output gear 60. The output gear 60 is located on the end of the second gearshaft 20 adjacent first gear 20a, and is engaged with a gear on a power output shaft (neither shown).

Figure 2:
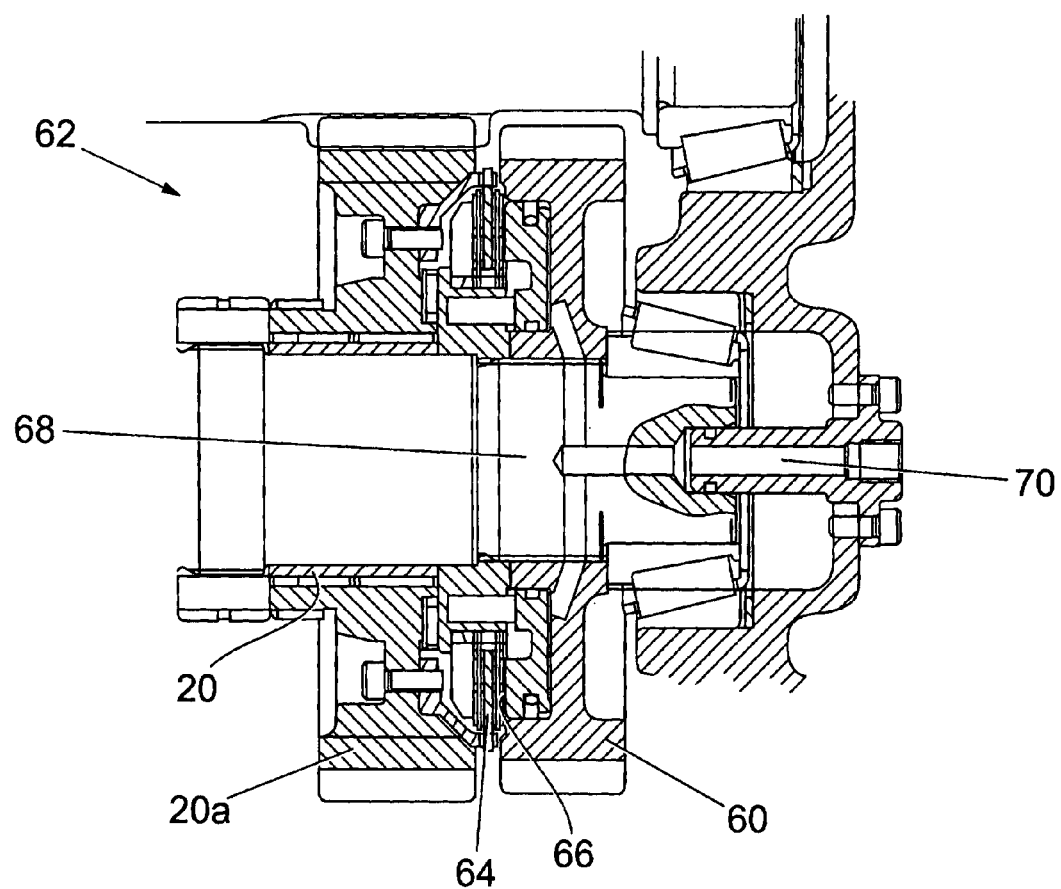
FIG. 2 shows a detail view of a exemplary clutch mechanism for the exemplary gearbox shown in FIG. 1.

As shown in detail in FIG. 2, first gear 20a is the largest diameter gear on the second gearshaft 20 in permanent engagement with the first gearshaft 14. First gear 20a and the output gear 60 make up an auxiliary clutch mechanism 62. The side of first gear 20a facing the output gear 60 has a clutch plate 64 attached thereto, while the side of the output gear 60 facing first gear 20a has a pressure plate 66 attached thereto. In the same manner as the shift collars 27, 28, the output gear 60 rotates with the second gearshaft 20, but can move axially along the shaft 20. An adjustment mechanism comprising a hydraulic piston 68 is attached to the output gear 60. The piston 68 can be selectively actuated by hydraulic fluid entering through a fluid passage 70 in order to move the output gear axially into and out of contact with first gear 20a.

Referring again to FIG. 1, each shift collar 27, 28 is attached to a respective shift rod via a shift fork 40, 42. In the illustrated embodiment, only the second shift rod 44 associated with third and fourth gears 20c, 20d is shown, as the first shift rod associated with first and second gears 20a, 20b is hidden behind the second shift rod. However, the shift fork 40 associated with the first shift rod can be clearly seen. Each shift rod is preferably selectively connected to a gearstick (not shown) in a conventional manner, wherein the shift rods and gearstick form a shift selector.

Each of the shift rods is provided with a shift hold mechanism configured to selectively hold the shift rod from entering a desired gear. For example, the shift hold mechanism may be a detent comprising a groove 50 in the shift rod and a ball 52 configured to be selectively received in the groove 50. The ball 52 may be biased towards the shift rod by a biasing mechanism, for example a spring 54. The shift hold mechanism also may include an actuator (not shown) configured to selectively move the ball 52 out of the groove 50 against the force of the spring 54. The actuator may be electro-magnetically or hydraulically operated, for example.

A controller (not shown), for example in the form of an electronic control unit (ECU), may be provided to control the gearbox. Speed sensors (not shown) may be used to monitor the rotational speeds of the first and second gearshafts 14, 20, and to relay those speeds to the controller. A shift position sensor (not shown) also may be provided which may detect the shift being made by an operator. The shift position sensor may relay information concerning the shift to the controller. The controller also may be in communication with the shift hold mechanism and can actuate the shift hold mechanism in order to release the shift rod so that a gearshift can be made. The forward, reverse, and auxiliary clutch mechanisms 16, 18, 62 also may be controlled by signals from the controller.

INDUSTRIAL APPLICABILITY

Figure 3:
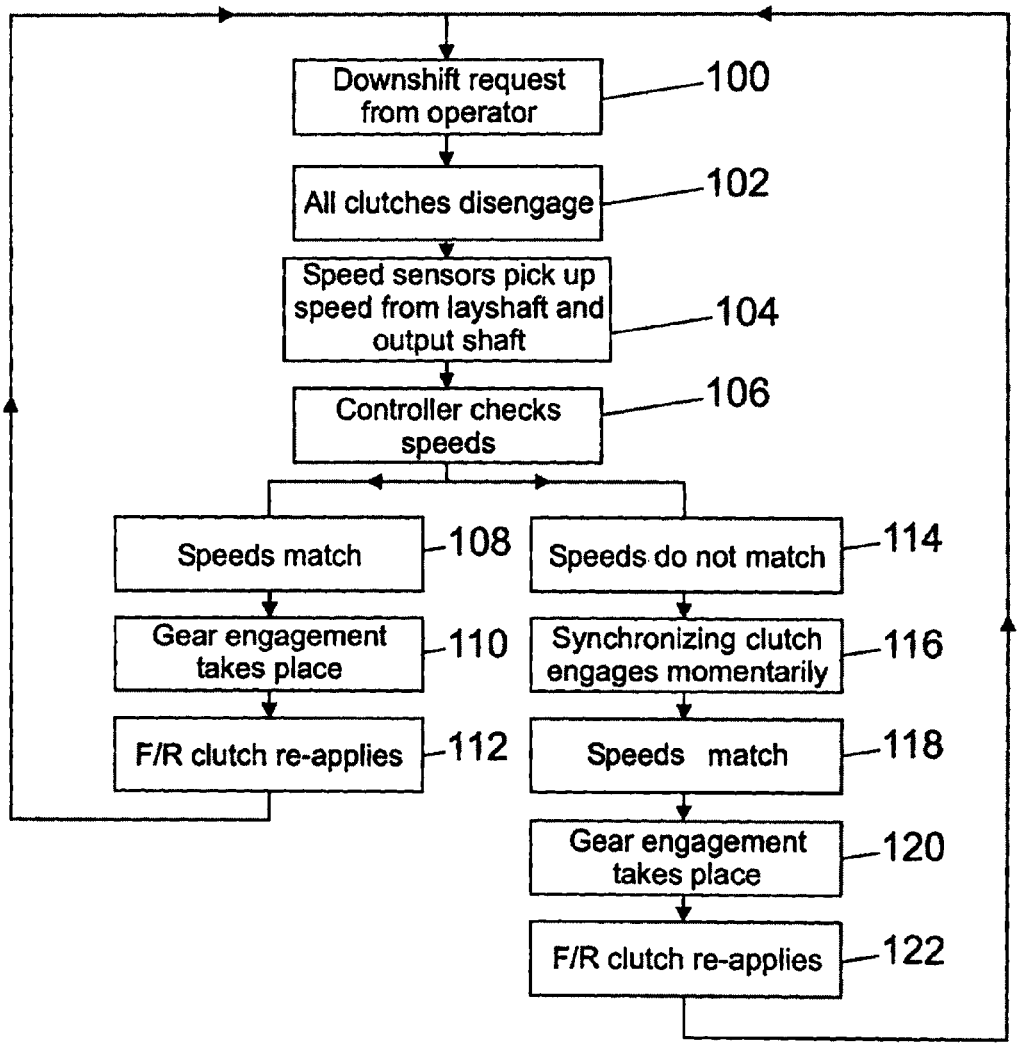
FIG. 3 shows a flowchart of exemplary steps taken by a controller of the exemplary gearbox of FIG. 1.

In order to make a shift, the operator may move the gearstick. As the gearstick is moved, the shift sensor may detect what the desired gear change is to be, and may send a signal which is received by the controller. FIG. 3 shows exemplary processing steps that may be applied by the controller when it detects that a downshift is to be made.

First, at step 100 the controller recognizes from the shift sensor that the shift to be made is a downshift. The controller then signals whichever of the forward and reverse clutches 16, 18 is currently engaged to disengage at step 102. At the same time, due to the operator shifting out of the present gear, the relevant shift rod will be moved back into a neutral position already held by the remaining shift rods in the gearbox. In moving back into the neutral position, the shift rod allows the biased ball 52 to enter the groove 50 of the detent such that the shift hold mechanism holds the shift rods in that position.

While the shift rods are held in the neutral position by the shift hold mechanism, at step 104 the speed sensors send the controller readings for the rotational speeds of the first and second gearshafts 14, 20. At step 106, the controller compares the rotational speeds of the gearshafts 14, 20. If both shaft speeds are within a predetermined range where they are substantially synchronized, as at step 108, the controller will actuate the shift hold mechanism in order to release the relevant shift rod. This allows the operator to move the gearstick and shift rod into position in order to shift into the desired new gear at step 110. The controller will then re-apply the forward or reverse clutch 16, 18 at step 112 and await the next shift request information from the shift sensor.

If the controller detects that the speeds of the first and second gearshafts 14, 20 are outside of the predetermined range and therefore not synchronized, as at step 114, the speed of one or both of the gearshafts 14, 20 may be adjusted. In such an instance, the controller momentarily engages the auxiliary clutch mechanism 62 at step 116, bringing the output gear 60 and the first gear 20a into contact. This contact utilizes the rotation of the second gearshaft 20 caused by the motion of the machine to speed up the first gear 20a, which in turns speeds up the first gearshaft 14 through its engagement with first gear 20a.

Once both shaft speeds are within the predetermined range where they are substantially synchronized, as at step 118, the controller will actuate the shift hold mechanism in order to release the relevant shift rod. This allows the operator to move the gearstick and shift rod into position in order to shift into the desired new gear at step 120. The controller will then re-apply the forward or reverse clutch 16, 18 at step 122 and await the next shift request information from the shift sensor.

Another manner in which the controller can adjust the speed of the gearshafts 14, 20 is by momentarily applying whichever clutch mechanism is not in operation. In other words, if the machine is moving forwards and the forward clutch mechanism 16 is engaged, the controller can momentarily engage the reverse clutch mechanism 18. By momentarily engaging the reverse clutch mechanism 18, the reverse clutch 18 applies a frictional force to the power input shaft 12, with the result that both the power input shaft and the first gearshaft 14 slow down. Once the controller detects that the slowing of the first gearshaft 14 has brought the speeds of both gearshafts 14, 20 into the predetermined range, it will allow the shift to take place as described above. The same technique can be applied when the reverse clutch mechanism 18 is engaged, but by momentarily engaging the forward clutch mechanism 16.

By locating the auxiliary clutch mechanism on the first gear of the second gearshaft, synchronization of the shaft speeds on a downshift can be achieved, but without having to increase the overall size of the gearbox to do so. Relatively little modification of a conventional gearbox is required to incorporate the disclosed arrangement, thereby keeping manufacturing costs down. Costs are also controlled by the use of existing gearbox components for controlling the speed of the shafts. Aside from the auxiliary clutch, no additional components may be needed.

The pressure plate of the auxiliary clutch need not be mounted on an output gear. In fact, the output gear and power output shaft can be dispensed with and the second gearshaft used as the power output shaft. In the case where no output gear is present, the pressure plate can either be mounted directly to the second gearshaft, or else mounted on a support which is non-rotatably fixed to the second gearshaft. The adjustment mechanism can then move the plate or support axially on the second gearshaft in the manner previously described. Furthermore, the adjustment mechanism is not limited to a hydraulic piston arrangement. Any other suitable arrangement may also be employed to move the pressure plate.

The first gearshaft may be a layshaft. However, it should be appreciated that the first gearshaft is not limited to a layshaft. While embodiments of the present disclosure may include a number of both forward and reverse gears, it is equally within the scope of the disclosure to include a gearbox having multiple forward gears and only one reverse gear.

Throughout this specification, reference is made to shifting from a first gear to a second gear. However, this is not to be construed as exclusively relating to shifting between the first and second gears on the second gearshaft. For example, embodiments are contemplated and considered to be within the scope of this disclosure wherein shifting occurs between any of the gears on the second gearshaft.

While the shift selector of the exemplary disclosed embodiments includes a number of shift rods and a manually-operated gearstick, it will be appreciated by those skilled in the art that it is within the scope of this disclosure that the shift selector may only comprise one or more shift rods in other embodiments. Furthermore, the shift selector is not limited to the inclusion of a gearstick. Instead, any other mechanism of manual, semi-automatic, or automatic selection of gears may comprise part of the shift selector.

Although the detent is disclosed as including a biased ball engaging a groove in the shift rod, this disclosure is by way of example, and not by way of limitation. Any other suitable detent arrangement may be employed to hold the shift rod.

While the shaft upon which the first and second clutch mechanisms are located has been described in the exemplary embodiments as the power input shaft, embodiments are contemplated wherein the first and second clutch mechanisms are located on the power output shaft. In other words, the gearbox of the present invention could be used in the opposite arrangement to that described, with the first and second clutch mechanisms located on a power output shaft, and the second gearshaft acting as the power input shaft. In such a case, the output gear and existing power output shaft can be dispensed with.

The foregoing modifications and other modifications and improvements may be incorporated without departing from the scope of the invention.

It will be apparent to those skilled in the art that the foregoing and other modifications and improvements can be made to the disclosed embodiments of a gearbox with a synchronizing clutch without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A gearbox having at least two gears and comprising:
   a shift selector;
   a first gearshaft;
   a second gearshaft selectively engagable with the first gearshaft via the at least two gears, the at least two gears including a first gear, the second gearshaft being a power output shaft or fixed to an output gear configured to drive the power output shaft; and
   a first clutch mechanism located on the second gearshaft and configured to selectively engage the second gearshaft with the first gearshaft, the first clutch mechanism comprising:
      a clutch plate attached to the first gear on the second gearshaft; and
      a pressure plate directly attached to at least one of the power output shaft or the output gear;
   wherein the clutch plate and pressure plate are configured to selectively engage one another so that the second gearshaft engages the first gearshaft.

2. The gearbox of claim 1, wherein the second gearshaft is fixed to the output gear configured to drive the power output shaft.

3. The gearbox of claim 2, wherein the pressure plate is directly attached to the output gear.

4. The gearbox of claim 1, further including an pressure plate adjustment mechanism configured to move the pressure plate axially along the second gearshaft.

5. The gearbox of claim 1, further including a shift prevention mechanism configured to hold the shift selector so as to prevent entry of the shift selector into a second position corresponding with the engagement of a second gear from a first position corresponding with the engagement of a first gear unless the rotational speeds of the first gearshaft and second gearshaft are within a predetermined range; and
   a controller configured to control the shift prevention mechanism.

6. The gearbox of claim 5, wherein the shift prevention mechanism includes:
   a position sensor configured to determine the position of the shift selector;

first and second speed sensors configured to determine the rotational speeds of the first gearshaft and second gearshaft, respectively; and a shift hold mechanism configured to selectively hold and release the shift selector;

wherein the controller is configured to receive information from the sensors and to engage the shift hold mechanism when the rotational speeds of the first gearshaft and second gearshaft are outside the predetermined range such that the shift selector is prevented from entering the second shift position, and release the shift hold mechanism when the rotational speeds of the first gearshaft and second gearshaft are within the predetermined range.

7. The gearbox of claim 6, further including at least one shift rod, and wherein the shift hold mechanism is a detent configured to selectively engage the shift rod so as to prevent movement thereof.

8. The gearbox of claim 5, further including a power input shaft and second and third clutch mechanisms, the second clutch mechanism configured to effect the selective engagement of the power input shaft with the first gearshaft and cause rotation of the first gearshaft in a first direction; and the third clutch mechanism configured to effect the selective engagement of the power input shaft with the first gearshaft and cause rotation of the first gearshaft in a second direction opposite to the first direction;

wherein the controller is configured to adjust the speed of the first gearshaft by either selectively engaging the second clutch mechanism when the first gearshaft is rotating in the second direction, or selectively engaging the third clutch mechanism when the first gearshaft is rotating in the first direction.

9. The gearbox of claim 5, wherein the controller is configured to selectively engage the first clutch mechanism to increase the speed of the first gearshaft.

10. The gearbox of claim 5, further including second and third clutch mechanisms, wherein the second clutch mechanism is configured to effect the selective engagement of the power output shaft with the first gearshaft and cause rotation of the power output shaft in a first direction;

wherein the third clutch mechanism is configured to effect the selective engagement of the power output shaft with the first gearshaft and cause rotation of the power output shaft in a second direction opposite to the first direction; and wherein the controller is configured to adjust the speed of the first gearshaft by either selectively engaging the second clutch mechanism when the power output shaft is rotating in the second direction, or selectively engaging the third clutch mechanism when the power output shaft is rotating in the first direction.

11. The gearbox of claim 5, wherein the shift prevention mechanism includes:

a position sensor configured to determine the position of the shift selector;

first and second speed sensors configured to determine the rotational speeds of the first gearshaft and second gearshaft, respectively;

shift hold mechanism configured to selectively hold and release the shift selector;

the gearbox further including a power input shaft and second and third clutch mechanisms, the second clutch mechanism configured to effect the selective engagement of the power input shaft with the first gearshaft and cause rotation of the first gearshaft in a first direction, and the third clutch mechanism configured to effect the selective engagement of the power input shaft with the first gearshaft and cause rotation of the first gearshaft in a second direction opposite to the first direction;

wherein the controller is configured to:

receive information from the sensors and to engage the shift hold mechanism when the rotational speeds of the first gearshaft and second gearshaft are outside the predetermined range such that the shift selector is prevented from entering the second shift position;

release the shift hold mechanism when the rotational speeds of the first gearshaft and second gearshaft are within the predetermined range; and adjust the speed of the first gearshaft by either selectively engaging the second clutch mechanism when the first gearshaft is rotating in the second direction, or selectively engaging the third clutch mechanism when the first gearshaft is rotating in the first direction.

12. The gearbox of claim 11, further including at least one shift rod, and wherein the shift hold mechanism is a detent configured to selectively engage the shift rod so as to prevent movement thereof.

13. The gearbox of claim 11, wherein the controller is configured to selectively engage the first clutch mechanism to increase the speed of the first gearshaft.

14. The gearbox of claim 5, wherein:

the shift prevention mechanism includes:

a position sensor configured to determine the position of the shift selector;

first and second speed sensors configured to determine the rotational speeds of the first gearshaft and second gearshaft, respectively; and a shift hold mechanism configured to selectively hold and release the shift selector;

the gearbox further includes second and third clutch mechanisms;

the second clutch mechanism is configured to effect the selective engagement of the power output shaft with the first gearshaft and cause rotation of the power output shaft in a first direction;

the third clutch mechanism is configured to effect the selective engagement of the power output shaft with the first gearshaft and cause rotation of the power output shaft in a second direction opposite to the first direction; and the controller is configured to:

receive information from the sensors and to engage the shift hold mechanism when the rotational speeds of the first gearshaft and second gearshaft are outside the predetermined range such that the shift selector is prevented from entering the second shift position;

release the shift hold mechanism when the rotational speeds of the first gearshaft and second gearshaft are within the predetermined range; and adjust the speed of the first gearshaft by either selectively engaging the second clutch mechanism when the power output shaft is rotating in the second direction, or selectively engaging the third clutch mechanism when the power output shaft is rotating in the first direction.

15. The gearbox of claim 14, further including at least one shift rod, and wherein the shift hold mechanism is a detent configured to selectively engage the shift rod so as to prevent movement thereof.

16. The gearbox of claim 1, further including:

a pressure plate adjustment mechanism configured to move the pressure plate axially along the second gearshaft, wherein the output gear is fixed to the second gearshaft and is configured to drive the power output shaft; and wherein the pressure plate is directly attached to the output gear.

17. A machine including a gearbox, the gearbox comprising:
- a plurality of gears;
- a shift selector;
- a first gearshaft;
- a second gearshaft selectively engagable with the first gearshaft via at least two of the plurality of gears, the at least two gears including a first gear, the second gearshaft being a power output shaft or fixed to an output gear configured to drive the power output shaft; and
- a first clutch mechanism located on the second gearshaft and configured to selectively engage the second gearshaft with the first gearshaft, the first clutch mechanism including:
  - a clutch plate attached to the first gear on the second gearshaft; and
  - a pressure plate directly attached to at least one of the power output shaft or the output gear;
- wherein the clutch plate and pressure plate are configured to selectively engage one another so that the second gearshaft engages the first gearshaft.

18. The machine of claim 17, further including a shift prevention mechanism configured to hold the shift selector so as to prevent entry of the shift selector into a second position corresponding with the engagement of a second gear from a first position corresponding with the engagement of a first gear unless the rotational speeds of the first gearshaft and second gearshaft are within a predetermined range; and
- a controller configured to control the shift prevention mechanism.

19. The machine of claim 18, further including a power input shaft and second and third clutch mechanisms, the second clutch mechanism configured to effect the selective engagement of the power input shaft with the first gearshaft and cause rotation of the first gearshaft in a first direction; and the third clutch mechanism configured to effect the selective engagement of the power input shaft with the first gearshaft and cause rotation of the first gearshaft in a second direction opposite to the first direction;

wherein the controller is configured to adjust the speed of the first gearshaft by either selectively engaging the second clutch mechanism when the first gearshaft is rotating in the second direction, or selectively engaging the third clutch mechanism when the first gearshaft is rotating in the first direction.

20. The machine of claim 18, further including second and third clutch mechanisms, wherein the second clutch mechanism is configured to effect the selective engagement of the power output shaft with the first gearshaft and cause rotation of the power output shaft in a first direction;

wherein the third clutch mechanism is configured to effect the selective engagement of the power output shaft with the first gearshaft and cause rotation of the power output shaft in a second direction opposite to the first direction; and wherein the controller is configured to adjust the speed of the first gearshaft by either selectively engaging the second clutch mechanism when the power output shaft is rotating in the second direction, or selectively engaging the third clutch mechanism when the power output shaft is rotating in the first direction.

21. The gearbox of claim 1, wherein the first gear is the largest diameter gear on the second gearshaft.

* * * * *